United States Patent [19]

Kunze et al.

[11] Patent Number: 5,011,332
[45] Date of Patent: Apr. 30, 1991

[54] APPARATUS AND METHOD FOR INTRODUCING A CABLE-LIKE ELEMENT INTO A PIPE AND ELEMENTS SUITABLE THEREFOR

[75] Inventors: Dieter Kunze, Neuried; Wolfgang Giebel, Planegg, both of Fed. Rep. of Germany

[73] Assignee: Siemens Aktiengesellschaft, Berlin and Munich, Fed. Rep. of Germany

[21] Appl. No.: 431,198

[22] Filed: Nov. 3, 1989

[30] Foreign Application Priority Data

Nov. 14, 1988 [DE] Fed. Rep. of Germany ...... 3842122

[51] Int. Cl.⁵ .................................................. F16L 1/12
[52] U.S. Cl. .................................... 405/158; 138/128; 254/134.3 FT; 254/134.3 SC; 405/154
[58] Field of Search ............ 254/134.3 SC, 134.3 FT, 254/134.4; 405/154, 158; 138/128

[56] References Cited

U.S. PATENT DOCUMENTS

| 2,408,253 | 9/1946 | Diebold | 138/128 |
| 3,138,859 | 6/1964 | Edwards | 138/128 |
| 3,996,968 | 12/1976 | Bergman et al. | 138/128 X |
| 4,232,981 | 11/1980 | Lee | 405/154 |
| 4,261,671 | 4/1981 | Langner | 405/158 X |
| 4,411,409 | 10/1983 | Smith | 254/134.3 FT |
| 4,422,673 | 11/1983 | Ramsden et al. | 254/134.3 FT |
| 4,552,338 | 11/1985 | Lindgren | 254/134.3 FT |
| 4,602,763 | 7/1986 | Gaylin | 254/134.3 FT |
| 4,892,442 | 1/1990 | Shoffner | 405/154 |
| 4,941,774 | 7/1990 | Harmstorf | 405/158 |

FOREIGN PATENT DOCUMENTS 0264767 4/1988 European Pat. Off. .
1040262 9/1983 U.S.S.R. ............................ 405/158

Primary Examiner—Dennis L. Taylor
Assistant Examiner—Arlen L. Olsen
Attorney, Agent, or Firm—Hill, Van Santen, Steadman & Simpson

[57] ABSTRACT

A method and apparatus for the promoting movement of a cable-like element in a selected direction in a pipe with the assistance of a flowing agent moving in the selected direction in the pipe include the use of profiles arranged on the external surface of the cable-like element to produce turbulence which promotes co-movement of the cable-like element in the pipe, together with the flowing agent in the selected direction. A number of different turbulence generating flow promoting structures for the profiles are disclosed.

30 Claims, 2 Drawing Sheets

APPARATUS AND METHOD FOR INTRODUCING A CABLE-LIKE ELEMENT INTO A PIPE AND ELEMENTS SUITABLE THEREFOR

BACKGROUND OF THE INVENTION

1. Field of the Invention

The invention relates to an apparatus and a method for the introduction of a cable-like element into a pipe with the assistance of a flowing medium.

2. Description of the Prior Art

In submarine laying of cables, the cable to be introduced is flooded into a pipe line with the assistance of flowing water. Such a method is disclosed in European Patent Application No. 0 264 767. To this end, guide or spacer elements that are somewhat smaller in diameter than the inside clearance of the pipe line are secured at intervals on the cable to be introduced. These guide or spacer elements are not attached to the cable until the laying event. As a result, special equipment is required at the opening of the pipeline. This requires additional outlay and additional assembly work.

SUMMARY OF THE INVENTION

An object of the present invention is to provide a method with which the introduction of the element to be introduced into the pipe or pipeline can be simplified.

Another object of the present invention is to provide a cable-like element to be introduced that has unimpeded transport over long distances without the use of further auxiliaries.

Another object of the present invention is to provide profilings on the envelope of the element to be introduced so turbulences are initiated in the flowing agent.

The above objects are achieved by a method executed and an element constructed in accordance with the principles of the present invention wherein the element to be introduced and the flowing medium are adapted to one another so that the element can float in the flowing medium. Flow turbulences are produced in the medium by firmly applied profile in the envelope of the element to be introduced. An elongated element has profile that are arranged on the outside of the envelope of the elongated element.

The advantages of the invention can be realized in many different ways; the method as well as the embodiments of the elongated elements are particularly suitable for the laying of light waveguide cables of communications technology. In submarine links, the cables are laid in pipelines below ground for reliability reasons with limits placed on the standard laying technique since unavoidable curvatures of the pipe result in increased amounts of friction between the pipe and the cables.

In the present invention, the elongated elements, preferably cables of light waveguide technology, are flooded into the pipeline entrained in or carried by a flowing liquid. Turbulences that result from the flow created by the structure of the present invention cause the introduced element to be carried along in the pipeline over great distances. To this end, the element to be introduced and the flowing agent are matched to one another so the element to be introduced floats in the flowing agent. Therefore, the cable may be carried a considerable distance into the pipeline given a flowing agent. In order to promote the process, the elongated element can also be pushed into the pipeline. Frictional forces, that oppose the introduction of the element into the pipeline, occur due to curvatures of the pipe and element to be introduced, as well as due to the intrinsic stiffness of the element to be introduced. These forces are already kept extremely low by using elements of high flexibility such as light waveguide cables, however, an additional friction-reducing material combinations are also desired. This is partly accomplished by utilizing straight pipes and employing curvature-free elements. Even when all of these steps are taken, relatively low limits on the introducible cable length remain. Since lengths of more than 10 km are often desired, given light waveguide cables that are reinforcement-free over long distances, additional steps within the scope of the present invention are necessary. High flow rates are employed when flooding the cable-carrying agent into the pipe. These high flow rates create turbulence at the boundaries of the element to be introduced and, as a result, carry it through the pipe with the cable experiencing oscillations or wave motions due to eddy currents. Limits are set on the generation of such high flow rates given the established pipe length, the technically reasonable diameters and the viscosity of the agent. Since the flow remains essentially laminar even when the element to be introduced has a round cross-section and lies at an angle relative to the pipe axis, the cable to be introduced can therefore not be carried away.

DETAILED DESCRIPTION OF THE PREFERRED EMBODIMENTS

Figure 1:
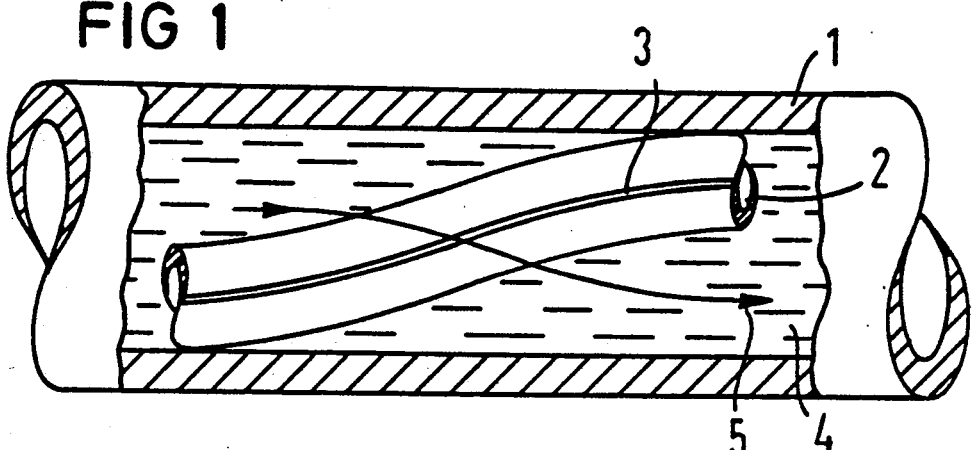
FIG. 1 shows the method for introducing an elongated element into a pipeline according to the present invention.

FIG. 1 illustrates the problem on which the invention is based. An elongated element to be introduced into a pipe, such as a light waveguide cable 2, is carried by a flowing agent 4, which may be water. The flow direction of the agent 4 is indicated by the arrows 5; it is also indicated that the agent 4 can flow past an element to be introduced, i.e., the light waveguide cable 2. For producing flow turbulences that effect an upswing and forward motion of the light waveguide cable 2, a profile 3, in the form of a longitudinally proceeding bead at the cable jacket, is then directly applied to this light waveguide cable 2. The profile 3 may be a radial projection from the cable jacket, or may be a channel formed or cut in the jacket. The profile 3 may be helically arranged on the outside of the jacket of the element to be introduced. It is also possible to arrange planar, discrete profiles longitudinally spaced from one another to generate turbulences at the leading and trailing edges. Given the continuous profile embodiments, sealing at the beginning of the pipeline can be carried out with simple means, such as a sluice. This would be required at the entry of the pipeline if embodiments having noncontinuous profilings at the element to be introduced are employed. Another possibility is that the element to be introduced be designed to have a tubular cross-section so the flowing agent can also flow through its inner region. Such an embodiment may be designed to have a band bent into a tube or in a concrete case designed to have a ribbon cable bent into a tube.

On the basis of the shape and on the basis of the material respectively employed for the jacket of the element to be introduced, an appropriate adaptation with respect to its weight and its buoyancy to the flowing agent can be undertaken so that the element to be introduced can float to minimize contact with the inner walls of the pipe.

The method of the invention can be employed in ocean laying as well as in land laying of cables in pipelines of any type. The configuration selected also makes it possible for a single cable or a number of cables to be introduced into a pipe. If a number of cables are inserted, these can be inserted simultaneously or in succession. It is also possible to employ the method for withdrawing elements that have already been introduced since the properties and characteristics of the firmly applied profiles are maintained.

The method of the present invention may be additionally improved when friction-reducing and lubricating liquids for wetting the elongated element are employed for the flooding. Water with wetting agent additives such as soap or oil additives which form an emulsion with water, or solid additives, such as plastic microparticles, is preferred as the flowing agent. The density of the flowing agent can be matched to the density of the element to be introduced to provide optimum buoyancy.

In the method of the invention, the flowing agent used for moving the element to be introduced can be collected again at the end of the pipe line for reuse. For example, this agent could be pumped in the opposite direction for removing the element that had been previously introduced into the pipe.

Embodiments that have profiles that proceed uniformly, particularly in the longitudinal direction, are preferred due to their simplicity, since the fewest problems arise upon introduction of the elements into the pipe and the pressurized agent. In addition, such elements can also be applied to the jacket of the elongated elements in an especially simple way in the extrusion process.

Figure 2:
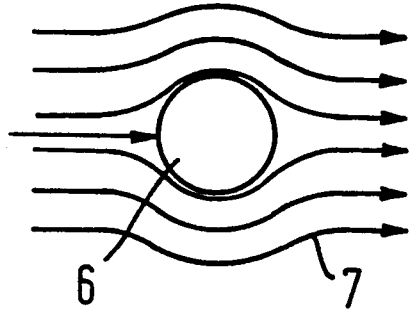
FIG. 2 shows the flow given employment of a traditional element.
Figure 3:
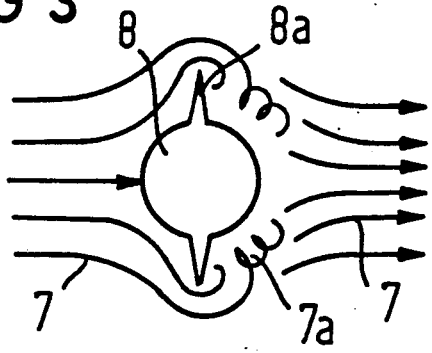
FIG. 3 shows the flow given employment of an element of the present invention.

FIGS. 2 and 3 illustrate the fluid dynamics of the invention. FIG. 2 shows that when a flowing agent, with flow lines 7 shown, flows around a smooth member 6, the flow is substantially unimpeded. FIG. 3, in contrast, shows that turbulence 7a in the flow indicated by the arrows 7 are formed when the flowing agent flows around a member 8 having laterally applied profiles 8a. The turbulence 7a, in the form of eddy currents, produce shear forces that cause the member 8 to execute wave motions. The forward motion of the article 8 is promoted in this fashion, as intended by the invention.

Figure 4:
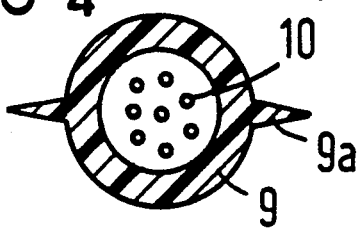
FIGS. 4–7 respectively show elements of the present invention which have a nearly circular cross-section.

FIG. 4, and following cross-sectional views, show the simplified form of an elongated element 9 that is provided with lateral profiles 9a either continuously or topically spaced. The illustration further indicates that individual elements, for example, light waveguides 10, can be contained in the interior of such an elongated element 9 which may be, for example, a light waveguide cable. Since the inner structure is not particularly relevant to the outer surface of the jacket of the elongated element 9, a more detailed description of the inner structure is not necessary.

Figure 5:
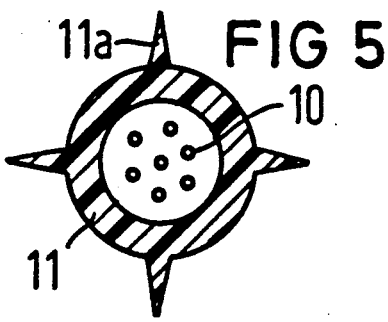

FIG. 5 shows another exemplary embodiment of an elongated element 11 including elements 10 arranged therein. This element 11 may have, for example, profiles 11a arranged on the outside of the jacket. The arrangement of the profiles can be appropriately designed longitudinally along a generated line or helically. Also, a punctiform arrangement of such profilings is also possible.

Figure 6:
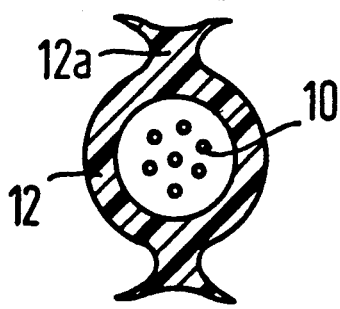

FIG. 6 shows an exemplary embodiment wherein the projections 12a are disposed on opposite sides of the jacket 12 of the longitudinally proceeding element 12. Here, specially formed projections for inducing pronounced turbulence are applied to these profiles 12a.

Figure 7:
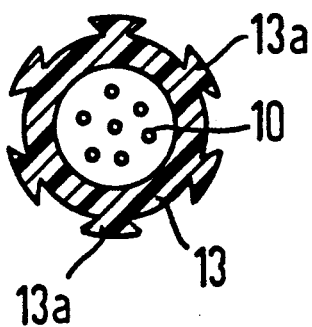

The longitudinally proceeding element 13 of FIG. 7 is provided with a number of undercut beads 13a that are distributed over the entire circumference of the jacket. These profiles induce the formation of large turbulence in the flow of the carrying agent.

Figure 8:
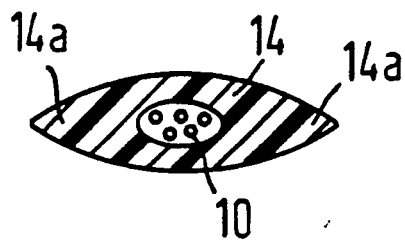
FIGS. 8–11 each show an approximately oblong cross-section of an element of the invention.

In the embodiment of FIG. 8, the jacket of the elongated element 14 itself is drawn out laterally to form profiles 14a so that a ribbon-like cable is obtained. Light waveguides 10 are indicated in the interior of the elongated element 14 which may be, for example, a light waveguide cable. As a result of the design of the elongated element 14 in FIG. 8, a preferred wave-shaped forward motion of the elongated element is obtained.

Figure 9:
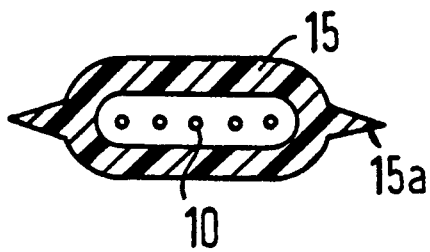

An elongated element 15 designed as a ribbon cable according to the present invention is shown in FIG. 9. The elongated element 15 is provided with laterally projecting profiles 15a that roughly correspond to the profilings of FIG. 4.

Figure 10:
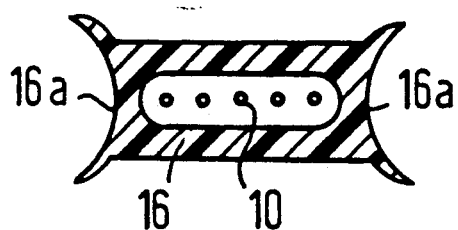

FIG. 10 shows a ribbon cable 16 with laterally projecting profiles 16a that roughly correspond to the profiles in the embodiment shown in FIG. 6.

Figure 11:
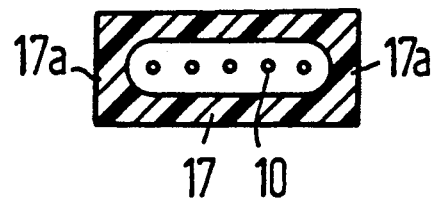

FIG. 11 shows the cross-section through a rectangular ribbon cable 17. In this embodiment, the lateral profiles 17a are flat and are formed by the spaced lateral sides of the ribbon cable 17. The ribbon cable 17 may alternatively be formed so as to have laterally projecting profiles, such as profiles 11a shown in FIG. 5.

Figure 12:
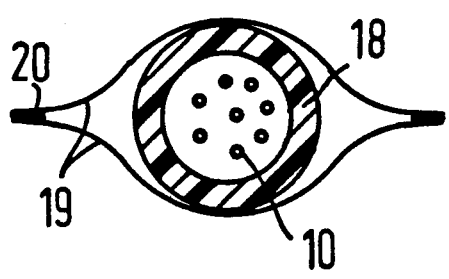
FIG. 12 shows an embodiment where profiling is achieved with the assistance of elongated bands.

FIG. 12 shows an elongated element, such as a cable 18 designed in a standard round shape, provided with profiles by applying longitudinally proceeding, initially flat bands or ribbons that are laterally welded together at seam 20. The projecting welds 20 form the profiles that create the required turbulence.

Figure 13:
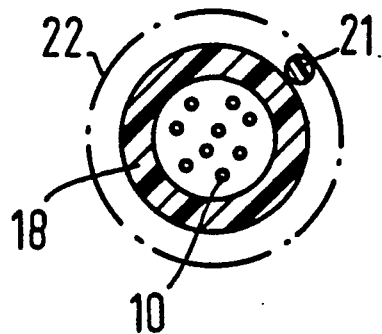
FIG. 13 shows an embodiment of an element to be introduced where a cable-like element is helically applied onto the envelope as profiling.

FIG. 13 shows an example of the attachment of a profile on the outer circumference of the jacket of an elongated element 18, such as a standard round cable. A special fiber 21 is applied either loosely or tightly in helical fashion to the elongated element 18. This combination can be manufactured in a relatively simple way by stranding the fiber 21 onto the exterior of the elongated element 18. The dot-dash limitation 22 is intended to indicate the effective outer diameter of the fiber 21 helically stranded around the elongated element 18.

Although modifications and changes may be suggested by those skilled in the art, it is the intention of the inventors to embody within the patent warranted hereon all changes and modifications as reasonably and properly come within the scope of their contribution to the art.

We claim:

1. A method for introducing a cable-like element into a pipe, comprising the steps of:
   matching the weight and buoyancy of a cable-like element with a fluid flowing agent so that said cable-like elements is substantially buoyant in said flowing agent;
   forming an exterior surface on said cable-like element having a solid profile means for treating turbulence within said fluid flowing agent and thereby promoting oscillatory flow of said cable-like element;
   generating a flow of said flowing agent in a pipe in a selected direction; and
   introducing said cable-like element with said profiles thereon into said flow of flowing agent in said pipe so that said profiles interact with said flow to impact oscillating motion to said cable-like element to assist in moving said cable-like element in said selected direction within said flow through said pipe.

2. A method as claimed in claim 1, wherein the step of forming profiles is further defined by forming a turbulence-creating flow-promoting continuous profile on an exterior of said cable-like element.

3. A method as claimed in claim 1, wherein the step of forming profiles is further defined by forming a plurality of discrete, spaced, turbulence-creating flow-promoting profiles on an exterior of said cable-like element.

4. A method as claimed in claim 1, wherein the step forming profiles is further defined by forming turbulence-creating flow-promoting projections on an exterior of said cable-like element.

5. A method as claimed in claim 1, wherein the step of forming profiles is further defined by forming turbulence-creating flow-promoting recesses in an exterior of said cable-like element.

6. A method as claimed in claim 1, comprising the additional steps of:
   forming a hollow interior in said cable-like element; and
   introducing said flowing agent into said hollow interior simultaneously with introducing said cable-like element into said flow of flowing agent.

7. A method as claimed in claim 1, comprising the additional step of:
   selecting a flowing agent which is a wetting agent for said cable-like element.

8. A method as claimed in claim 7, wherein the step of selecting a flowing agent is further defined by selecting water with a solid friction-reducing additive as said flowing agent.

9. A method as claimed in claim 8, comprising the additional step of:
   selecting plastic microparticles as said solid additive.

10. A method as claimed in claim 7, wherein the step of selecting a flowing agent is further defined by selecting water with soap as said flowing agent.

11. A method as claimed in claim 7, wherein the step of selecting a flowing agent is further defined by selecting water with oil additives in the form of an emulsion as said flowing agent.

12. A method as claimed in claim 1, wherein the step of introducing said cable-like element is further defined by introducing a single cable-like element into said flow of said flowing agent in said pipe.

13. A method as claimed in claim 1, wherein the step of introducing said cable-like element is further defined by introducing a plurality of cable-like elements in succession into said flow of said flowing agent in said pipe.

14. A method as claimed in claim 1, wherein the step of introducing said cable-like element is further defined by introducing a plurality of cable-like elements simultaneously into said flow of said flowing agent in said pipe.

15. A method as claimed in claim 1, comprising the additional steps of:
   after said cable-like element has been introduced into said pipe, generating a flow of said flowing agent in said pipe in a direction opposite to said selected direction to remove said cable-like element from said pipe with said profiles assisting in moving said cable-like element in said direction opposite to said selected direction with said flow out of said pipe.

16. A cable-like element adapted for introduction into a pipe with a fluid flowing agent moving in a selected direction in said pipe, said cable-like element comprising:
   an outer jacket having a weight and buoyancy matched to said fluid flowing agent so that said cable-like element is substantially buoyant in said fluid flowing agent;
   the exterior surface of said outer jacket having a solid profile means for creating turbulence and thereby promoting oscillatory flow of said cable-like element for assisting in moving said cable-like element in said selected direction in said pipe by carrying said cable-like element in said fluid flowing agent moving in said selected direction in said pipe.

17. A cable-like element as claimed in claim 16, wherein said profile is a continuous profile extending in a longitudinal direction along said cable-like element.

18. A cable-like element as claimed in claim 16, wherein said profile extends helically around said surface of said jacket.

19. A cable-like element as claimed in claim 16, wherein said profile is a series of discrete, spaced profile sections.

20. A cable-like element as claimed in claim 16, wherein said profile is a projection extending from said surface of said jacket.

21. A cable-like element as claimed in claim 16, wherein said profile is a recess in said surface of said jacket.

22. A cable-like element as claimed in claim 21, wherein said profile is formed by two longitudinally extending ribbons surrounding said surface of said jacket joined by a longitudinally running, laterally extending weld.

23. A cable-like element as claimed in claim 16, wherein said profile is formed by an outwardly tapering extension of said jacket.

24. A cable-like element as claimed in claim 22, wherein said jacket is substantially flat.

25. A cable-like element as claimed in claim 22, wherein said cable-like element has an oval cross-section.

26. A cable-like element as claimed in claim 16, wherein said profile comprises a fiber-like element extending and attached helically around said surface of said cable-like element.

27. A cable-like element as claimed in claim 16, wherein said profile is adapted in thickness so that said flowing agent flows in said selected direction in said pipe, with said cable-like element in said pipe, substantially without interruption.

28. A cable-like element comprising:
   an outer jacket having an exterior surface; and a plurality of solid, radially extending projection means integrally formed on said exterior surface of said outer jacket for creating turbulence and thereby promoting oscillatory movement of said cable-like element in a selected direction in a pipe together with a flow of flowing agent moving in said pipe in said selected direction.

29. A cable-like element comprising:

an outer jacket having an exterior surface in which a plurality of radially inwardly extending recess means are formed for creating turbulence and thereby promoting oscillatory movement of said cable-like element in a selected direction in a pipe together with a flow of flowing agent moving in said pipe in said selected direction.

30. An article element comprising: a cable-like element an outer jacket on said cable-like element having an exterior surface, said jacket extending in a longitudinal direction;

two deformable, initially flat ribbons disposed to project from opposite sides of said exterior surface of said jacket, said ribbons overlapping and laterally projecting from said outer surface of said jacket; and two welds running parallel to said longitudinal direction of said jacket and joining said ribbons to form projection means extending laterally from said jacket for creating turbulence and promoting oscillatory movement of said cable-like element in a selected direction in a pipe together with a flow of flowing agent moving in said selected direction in said pipe.

* * * * *